United States Patent [19]

Tsou

[11] Patent Number: 4,512,496
[45] Date of Patent: Apr. 23, 1985

[54] HIGH PRESSURE FEEDWATER HEATER CLOSURE ASSEMBLY

[75] Inventor: John L. Tsou, Berlin, Wis.

[73] Assignee: McQuay, Inc., Minneapolis, Minn.

[21] Appl. No.: 636,911

[22] Filed: Aug. 2, 1984

Related U.S. Application Data

[63] Continuation-in-part of Ser. No. 531,907, Sep. 12, 1983, Pat. No. 4,470,516.

[51] Int. Cl.³ ............................................. B65D 45/32
[52] U.S. Cl. .................... 220/319; 220/240; 220/327; 220/328
[58] Field of Search ............. 220/240, 328, 319, 3, 220/327; 277/190, 191, 117

[56] References Cited

U.S. PATENT DOCUMENTS

| | | | |
|---|---|---|---|
| 4,140,240 | 2/1979 | Platts | 220/319 |
| 4,351,450 | 9/1982 | Summerfield | 220/319 |

*Primary Examiner*—George T. Hall
*Attorney, Agent, or Firm*—Merchant, Gould, Smith, Edell, Welter & Schmidt

[57] ABSTRACT

The specification discloses an improved removable closure assembly (28) for use in feedwater heater or other pressure vessels requiring periodic internal access thereto for service, etc. The closure assembly (28) includes an o-ring seal (54) seated in a groove (58) chamfered into the outer edge of one end of a cylindrical cover (30) disposed in the open end of the channel or casing (12) of the pressure vessel. A compression ring (56) is disposed between the cover (30) and a split retaining ring (36) which are drawn together by bolts (60). The compression ring (56) overlies the o-ring (54) and a portion of the cover (30) so that only a portion of the compression force is transmitted through the o-ring, whereby an effective seal is provided without undue deformation such that the closure assembly (28) can be readily disassembled and removed, if desired. In a second embodiment, the closure assembly (66) incorporates a holding ring (68) which is secured by the bolts (70, 72) to the cover (30) over the retaining ring (36') and compression ring (56').

11 Claims, 6 Drawing Figures

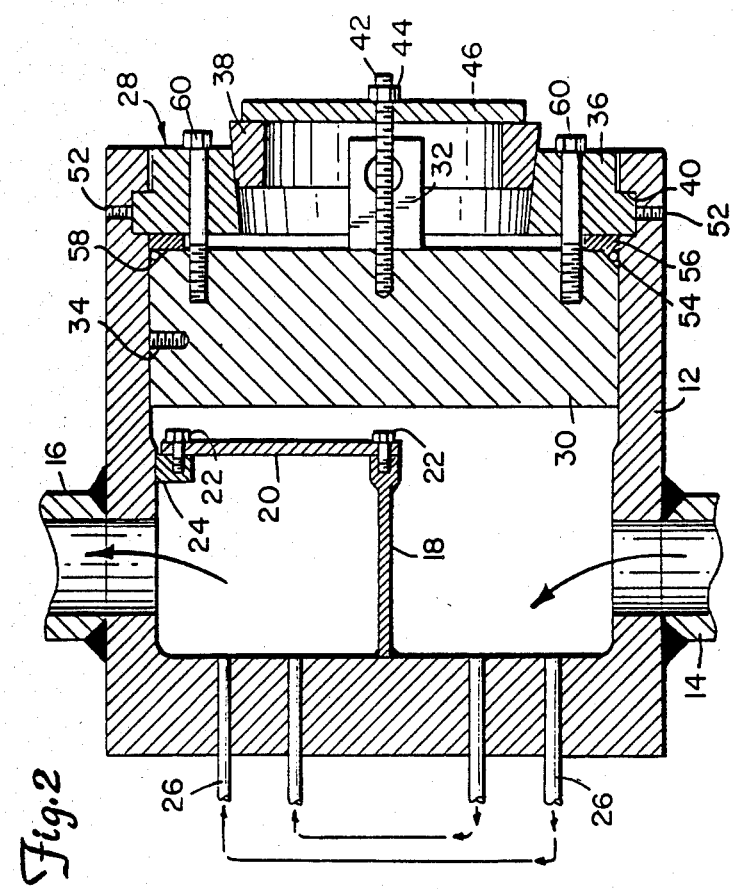
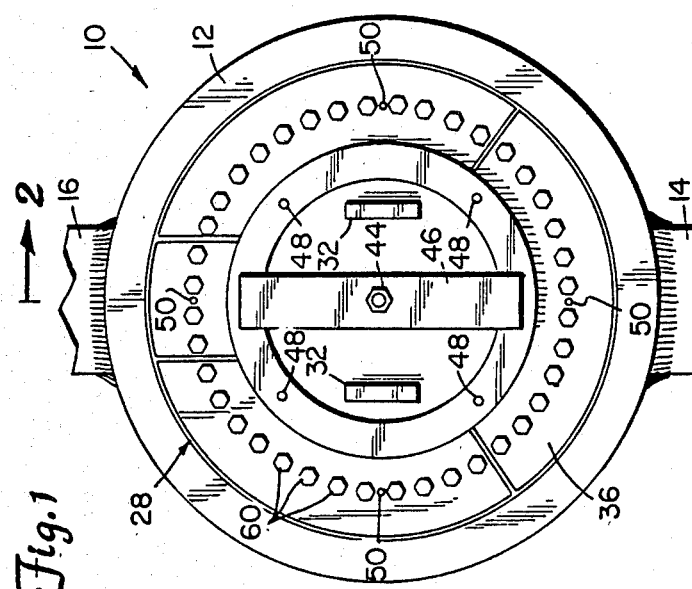
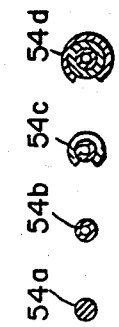
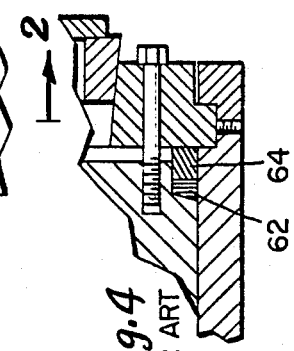

HIGH PRESSURE FEEDWATER HEATER CLOSURE ASSEMBLY

CROSS REFERENCE TO RELATED APPLICATION

This application is a continuation-in-part of prior copending application Ser. No. 531,907 filed Sept. 12, 1983, now U.S. Pat. No. 4,470,516.

TECHNICAL FIELD

The present invention relates generally to a closure for pressure vessels. More particularly, this invention concerns an improved closure assembly for use with high pressure feedwater heaters, like those utilized in power plants, which is particularly adapted to facilitate better sealing and easier disassembly after operation for servicing, etc.

BACKGROUND OF THE INVENTION

In power generating plants, heat transfer between the steam and water is accomplished by means of feedwater heaters. Such heaters typically operate under high pressures on the order of 1,000 to 5,000 PSI, and must be constructed to withstand such pressures and to permit access to the interior for inspection, cleaning and the like. Feedwater heaters generally comprise a cylindrical casing, a removable closure assembly, and a seal therebetween. The closure assembly is usually designed so that internal pressurization of the feedwater heater facilitates and maintains a proper seal with the casing. Metallic gaskets of various types have been used for this purpose, however, the designs of the closure assemblies of the prior art have tended to cause extreme deformation of the gaskets, shortening their service lives and making removal of the closure assemblies a difficult, time consuming task. Specialized equipment and techniques have been required to remove the closure assembly from the casing in some circumstances. It is thus desirable to design the closure assembly and seal to provide effective sealing when the feedwater heater is under pressurization, while enabling complete disassembly after operation without the difficulties which have characterized the prior art.

U.S. Pat. No. 4,239,124 shows a fluid-tight closure apparatus representative of one prior art approach to this problem. In this device, the inside end of the closure wall is formed to receive a circular pressurizing ring which contacts a surrounding seal and packing ring to effect sealing engagement with the inside surface of the casing. This approach, however, requires specially formed parts and is still subject to some of the difficulties of the prior art. Since all of the compression force is transmitted through the gasket, a relatively large bearing area is required. This type of gasket is usually of one-piece construction, which is expensive and not readily available. Further, after compression, this gasket also tends to wedge between the adjacent parts making separation and removal difficult.

SUMMARY OF INVENTION

The present invention comprises an improved high pressure feedwater heater closure, and particularly an end assembly and seal therefor, which overcomes the foregoing and other difficulties associated with the prior art. In accordance with the invention, there is provided a closure assembly for a pressure vessel which incorporates unique design features and a special seal arrangement to effect a proper seal while permitting convenient disassembly without special tools or undue difficulty.

In a first embodiment, the closure assembly comprises an end piece or channel cover which is slideably received in the open end of the casing and retained in place against outward axial movement by a split retaining ring. Provided between the end piece and retaining ring are an o-ring seal, seated in a groove chamfered in the outer edge of the end piece, and a compression ring which overlies the o-ring and a portion of the end piece such that only a predetermined portion of the compression force is directed through the o-ring seal. The compression force exerted by the end piece upon internal pressurization is transferred in part by the compression ring without undue deformation of the o-ring such that the closure assembly can be readily removed, as desired.

In a second embodiment, the end piece or channel cover is retained in place in the casing by the split retaining ring and a holding ring.

BRIEF DESCRIPTION OF DRAWINGS

A better understanding of the invention can be had by reference to the following Detailed Description in conjunction with the accompanying Drawings, wherein:

FIG. 1 is an end view of a feedwater heater incorporating the first embodiment of the closure assembly of the invention;

FIG. 2 is a cross-sectional view taken along lines 2—2 of FIG. 1 in the direction of the arrows;

FIG. 3 is cross-sectional details of suitable o-ring seal constructions;

FIG. 4 is an enlarged partial cross-sectional view showing a sealing arrangement of the prior art;

DETAILED DESCRIPTION

Figure 6:
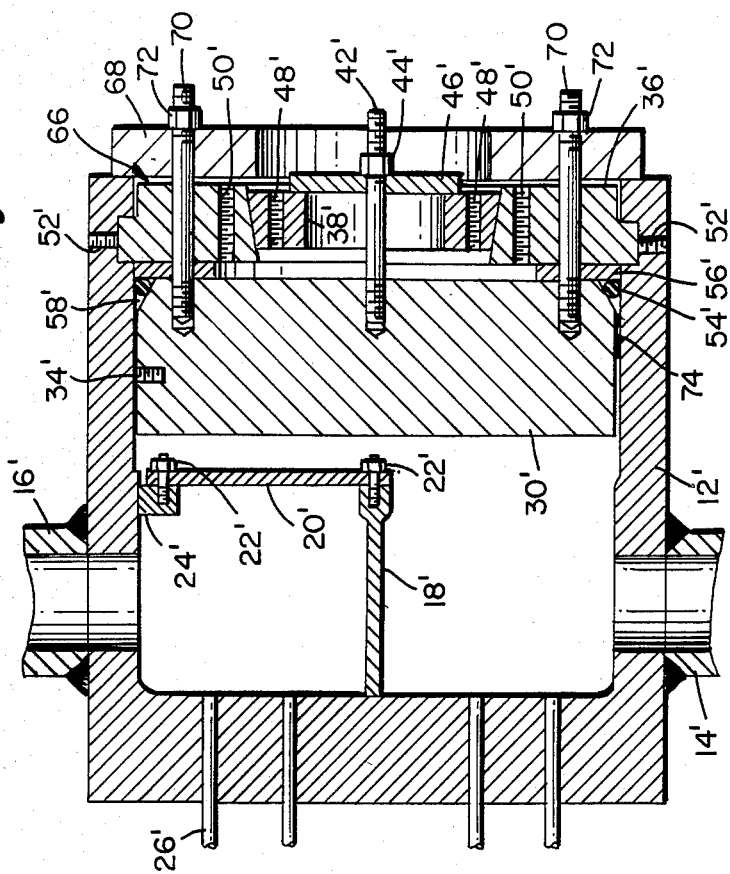
FIG. 6 is a cross-sectional view taken along lines 6—6 of FIG. 5 in the direction of the arrows.

Referring now to the Drawings, wherein like reference numerals designate like or corresponding elements throughout the views, and particularly referring to FIGS. 1 and 2, there is shown a portion of a feedwater heater 10 of the type which is typically used in power generating plants. Feedwater heaters of this type can be about 25–60 feet long and 24–50 inches in diameter, capable of operation under pressures of 1,000–5,000 PSI, and are therefore of relatively massive construction. The feedwater heater 10 includes a cylindrical channel or casing 12 connected to one end of a shell (not shown) which has been omitted for purposes of clarity.

The casing 12 includes an inlet 14 and an outlet 16 opening into its interior, which is divided into two subchambers by means of a lateral divider or partition 18 and a semi-circular cover 20 which is secured by bolts 22 to the partition and a semi-circumferential shoulder 24 secured to the interior of the casing. A number of tubes 26 are provided in the closed end of the casing 12. The tubes 26, of which there are typically many, can be U-tubes having one end connected to the subchamber adjacent the inlet 14 and the other end connected to the subchamber within partition 18 and cover 20 adjacent the outlet 16. A first fluid, such as feedwater, is circulated through the casing 12 and tubes 26, while a second fluid, such as steam, is circulated through the shell (not shown) of the feedwater heater 10 so as to effect heat transfer between the fluids.

A removable closure assembly 28 incorporating a first embodiment of the invention is provided in the open end of the casing 12. As will be explained more fully hereinafter, the closure assembly 28 utilizes a unique seal arrangement which provides a good seal with the casing 12 when the feedwater heater 10 is operating under pressure, and which also facilitates complete removal of the closure assembly for servicing, maintenance and the like after shutdown of the feedwater heater. Although the closure assembly 28 herein is illustrated and described particularly for use with feedwater heaters, it will be understood that the closure assembly of the invention can be adapted for use in other types of pressure vessels wherein periodic, convenient access to the interior is desirable.

The removable closure assembly 28 includes a cylindrical end piece or channel cover 30 which is dimensioned for slidable receipt in the open end of the casing 12. The channel cover 30 is of relatively thick, heavy construction, and pulling lugs 32 are provided on the outside end of the cover to facilitate pulling it out of the casing 12. A threaded lifting hole 34 is provided in the side of the channel cover 30 to facilitate lifting and handling. It will thus be apparent that the channel cover 30 defines one end wall of the chamber within casing 12.

A split retaining ring 36 and a position ring 38 are provided for constraining the channel cover 30 against outward axial movement from the casing 12. The outside periphery of the split retaining ring 36 is stepped as shown for receipt by an inside circumferential groove 40 formed in the casing 12. The split retaining ring 36 is preferably comprised of segments shaped as is best seen in FIG. 1 in order to facilitate insertion and removal of the ring without interference between the segments thereof. The inside periphery of the retaining ring 36 is angled as shown so that the segments of the ring are wedged outwardly into the groove 40 upon insertion of the solid position ring 38. A threaded tie bolt 42 and nut 44 are provided for pulling together the channel cover 30 and position ring 38 to effect such wedging action. The bolt 42 is screwed at one end to the outside end of the channel cover 30, while the nut 44 is provided on the other end, which passes through a hole in a tie bar 46 bridging the position ring 38.

Axial jack screw holes 48 and 50, as are best seen in FIG. 1, are provided in the position ring 38 and split retaining ring 36, respectively, to facilitate separation of the retaining and position rings. Similarly, radial jack screw holes 52, as are best seen in FIG. 2, are provided in the casing 12 to facilitate disengagement of the split retaining ring 36 from groove 40.

Referring now to FIGS. 2 and 3, a seal comprising an o-ring 54 and compression ring 56 are provided between the channel cover 30 and split retaining ring 36. The o-ring 54 is positioned in a bevelled groove 58 formed by chamfering the edge of the outside end of the channel cover 30. The o-ring 54 can be of any suitable construction, in accordance with the fluids and operating pressures of the particular application. For example, as shown in FIG. 3, an o-ring 54-a of solid cross-section, an o-ring 54-b of hollow cross-section, or spring energized o-rings 54-c and 54-d having inner helical springs surrounded by metal jackets of c-shaped cross-section can be used. The o-rings 54-a and 54-b can be of copper or other suitable metal. O-rings suitable for use as o-ring 54 are commercially available from Helicoflex Company of Boonton, N.J., and from Advanced Products Company of North Haven, Conn., for example. In the feedwater heater 10 as shown, the o-ring 54 is preferably formed of copper or otherwise metallized; however, the o-ring could be formed of other materials in different applications.

It will be noted that the compression ring 56 overlies the o-ring 54 and a portion of the channel cover 30. This comprises an important feature of the invention, together with location of the o-ring 54 in the bevel groove 58. Tightening the pull-up bolts 60, which extend through holes in the split retaining ring 36 and screw into the channel cover 30, preloads the o-ring 54 by compressing it inward in the bevel groove 58 and thus outward against casing 12, to form an initial seal between the closure assembly 28 and the casing. When the feedwater heater 10 is in operation, of course, the internal pressure on the inner end of the channel cover 30 actuates and thus maintains compression of the o-ring 54 in order to provide an effective seal between the closure assembly 28 and the casing 12. The compression ring 56 contacts the split retaining ring 36 and bears upon both the o-ring 54 and the channel cover 30 such that a portion of the compression force from the channel cover is transferred directly into the split retaining ring 36. The o-ring 54 is compressed in the bevel groove 58 sufficiently to form a good seal, but since only a predetermined portion of the compression force is directed through the o-ring, it does not become crushed or deformed to such an extent that it impedes removal of the channel cover when the closure assembly 28 is disassembled.

In contrast, FIG. 4 shows a seal arrangement representative of the prior art. This prior art seal arrangement incorporates a soft copper gasket 62 seated in a notch, together with a narrow compression ring 64. It will be noted that the compression ring 64 overlies only the soft copper gasket 62 such that, when the casing is pressurized, all of the compression force from the channel cover is transmitted to the split retaining ring via the gasket. This arrangement concentrates the forces through the gasket such that it deforms severely and flows partially into the annular space between the channel cover and casing, which in turn leads to extreme difficulties in removing the channel cover. The present invention comprises a significant improvement over this prior art approach.

Figure 5:
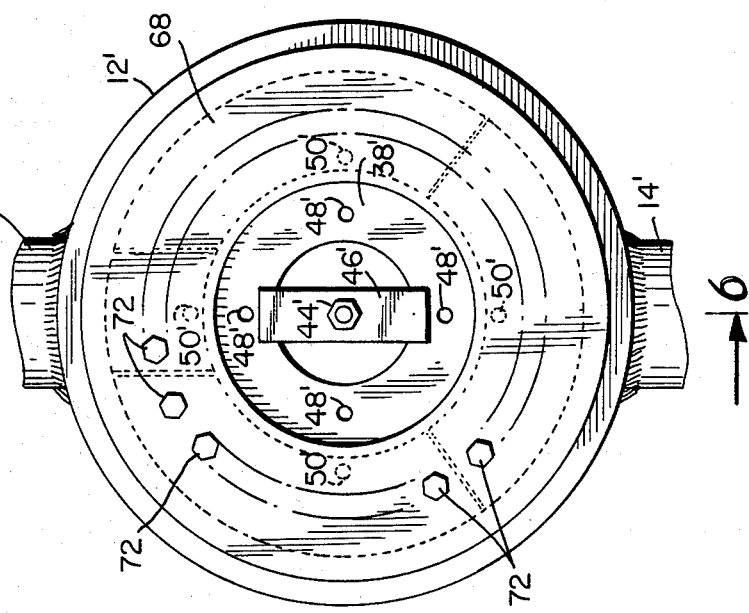
FIG. 5 is an end view of a feedwater heater incorporating the second embodiment of the closure assembly of the invention.

Referring now to FIGS. 5 and 6, there is shown a removeable closure assembly 66 incorporating a second embodiment of the invention. The closure assembly 66 includes several components which are substantially identical in construction and function to corresponding components of the closure assembly 28 of the first embodiment. Such common components have been identified in FIGS. 5 and 6 with the same reference numerals utilized in connection with the first embodiment shown in FIGS. 1 and 2, but have been differentiated by means of prime (') notations.

The primary distinction between the two embodiments comprises the fact that the closure assembly 66 incorporates a solid holding ring 68 over the end of the casing 12'. The holding ring 68 overlies the end of the casing 12', but does not bottom out on either the split retaining ring 36' or the solid position ring 38'. The thicknesses of the split retaining ring 36' and the solid position ring 38' are relatively less than those of the first embodiment so that the holding ring 68 does not rest on these parts. Threaded tie bolts 70 and nuts 72 are provided for pulling together the channel cover 30', compression ring 56', and split retaining ring 36' in order to obtain even better sealing, particularly under cyclic operating conditions. The tie bolts 70 extend through clearance holes in the holding ring 68 and the split retaining ring 36', and are screwed at their inner ends to the channel cover 30' in similar fashion to the pull-up bolts 60 of the first embodiment. The closure assembly 28 of the first embodiment, however, incorporates pull-up bolts 60 secured between the channel cover 30 and the split retaining ring 36, whereas the closure assembly 66 of the second embodiment utilizes tie bolts 70 and nuts 72 secured between the channel cover 30' and the holding ring 68. If desired, pull-up bolts can be substituted for tie bolts 70 and nuts 72 in some applications, and it will be understood that these connectors are considerably fully equivalent.

In addition, the closure assembly 66 preferably includes a relatively wider compression ring 56' having a smaller internal diameter than the compression ring 56 of the first embodiment, so as to provide more bearing area between the channel cover 30' and the split retaining ring 36'. Access holes as shown in FIG. 5 can be provided in the compression ring 56' for passage of the tie bolts 70. If desired, shims 74 can be added between the channel cover 30' and casing 12' for centering purposes. In all other respects, the closure assembly 66 functions substantially the same as the closure assembly 28.

From the foregoing, it will thus be apparent that the present invention comprises an improved closure assembly for pressure vessels having several advantages over the prior art. In the prior art, all of the compression force was transmitted through the gasket in order to obtain a good seal, however, this caused severe deformation which later made it extremely difficult to complete disassembly of the closure assembly without special tools and techniques. In the present invention, a controlled portion of the compression force is transmitted through the o-ring seal, with the remainder being carried directly by the compression ring such that an effective seal is maintained without undue deformation of the o-ring. Other advantages will be evident to those skilled in the art.

Although particular embodiments of the invention have been illustrated in the accompanying Drawings and described in the foregoing Detailed Description, it will be understood that the invention is not limited to the embodiments disclosed, but is intended to embrace any alternatives, equivalents, modifications and/or rearrangements of elements falling within the scope of the invention as defined by the following claims.

I claim:

1. In a pressure vessel having open and closed ends, a closure assembly comprising:
   a generally cylindrical cover adapted for axial receipt in the open end of the pressure vessel;
   means including a holding ring over the open end of the pressure vessel, defining a releasable retainer for constraining said cover against axial movement outward from the pressure vessel;
   an o-ring seated in a predetermined chamfered groove formed in the outside edge of the end of said cover adjacent said retainer means; and
   a compression ring disposed between said cover and retainer means, said compression ring overlying said o-ring and a predetermined portion of said cover so that part of the force exerted upon pressurizing the vessel is transferred directly to said retainer means through said compression ring without undue deformation of said o-ring.

2. The closure assembly of claim 1, wherein said o-ring is of solid cross section.

3. The closure assembly of claim 1, wherein said o-ring is of hollow cross section.

4. The closure assembly of claim 1, wherein said o-ring is of hollow cross section comprising an inside helical spring and an outside c-shaped liner.

5. The closure assembly of claim 1, wherein said compression ring is of substantially rectangular cross section.

6. The closure assembly of claim 1, wherein said retainer means comprises:
   a split retaining ring having a stepped outer periphery adapted for receipt by an inside groove formed in the pressure vessel adjacent the open end thereof;
   a solid position ring adapted for wedging receipt in said retaining ring;
   means for pulling said position ring into said retaining ring; and
   means for pulling said cover, holding ring, and said retaining ring together over said o-ring and compression ring.

7. A closure assembly for a pressure vessel having open and closed ends, which comprises:
   a generally cylindrical cover adapted for axial slidable receipt in the open end of the pressure vessel, said cover having inner and outer end faces;
   a split retaining ring disposed outward of said cover, said split retaining ring having an outer circumferential stepped periphery adapted for receipt by an inner circumferential groove formed in the pressure vessel adjacent the open end thereof;
   a metallic o-ring seated in a predetermined groove formed in the outer edge of the outside end face of said cover;
   a compression ring disposed between said cover and said split retaining ring, said compression ring overlying said o-ring and a portion of the outside end face of said cover;
   a holding ring disposed about the open end of the pressure vessel; and
   means for drawing said cover, compression ring, split retaining ring, and holding ring together to preload said o-ring.

8. The closure assembly of claim 7, wherein the predetermined groove comprises a bevel groove chambered into the outside end face of said cover.

9. The closure assembly of claim 7, further including:
   a solid position ring adapted for wedging receipt in said split retaining ring; and
   means for drawing said split retaining ring and position ring together.

10. The closure assembly of claim 7, wherein said means for drawing said cover, compression ring, split retaining ring, and holding ring together comprises a plurality of bolts, each bolt extending through said split retaining ring and being threadedly secured to said cover.

11. A closure assembly for a pressure vessel having open and closed ends, which comprises:
   a generally cylindrical cover adapted for axial slidable receipt in the open end of the pressure vessel, said cover having inner and outer end faces;

a split retaining ring disposed outward of said cover, said split retaining ring having an outer circumferential stepped periphery adapted for receipt by an inner circumferential groove formed in the pressure vessel adjacent the open end thereof;

a position ring adapted for wedging receipt in said split retaining ring;

a holding ring disposed about the open end of the pressure vessel;

means for drawing said cover and position ring together over said split retaining ring;

an o-ring seated in a bevel groove formed in the outer edge of the outside end face of said cover;

a compression ring disposed between said cover and split retaining ring, said compression ring being of generally rectangular cross-section and overlying said o-ring and a portion of the outside end face of said cover; and means for drawing said cover and said holding ring together over said split retaining ring and said compression ring to preload said o-ring.

* * * * *